US012763952B2

(12) United States Patent
Kwon

(10) Patent No.: US 12,763,952 B2
(45) Date of Patent: *Oct. 13, 2026

(54) CROSS CERTIFICATION METHOD AND CERTIFYING DEVICE FOR PROVIDING THE METHOD

(71) Applicant: LG Energy Solution, Ltd., Seoul (KR)

(72) Inventor: Junghyun Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 127 days.

This patent is subject to a terminal disclaimer.

(21) Appl. No.: 18/954,349

(22) Filed: Nov. 20, 2024

(65) Prior Publication Data

US 2025/0150274 A1 May 8, 2025

Related U.S. Application Data

(63) Continuation of application No. 18/008,916, filed as application No. PCT/KR2021/009683 on Jul. 27, 2021, now Pat. No. 12,212,675.

(30) Foreign Application Priority Data

Sep. 21, 2020 (KR) ........................ 10-2020-0121338

(51) Int. Cl.

*H04L 9/32* (2006.01)
*H04L 9/08* (2006.01)
*H04L 9/14* (2006.01)

(52) U.S. Cl.

CPC ............ *H04L 9/321* (2013.01); *H04L 9/0869* (2013.01); *H04L 9/14* (2013.01)

(58) Field of Classification Search

None

See application file for complete search history.

(56) References Cited

U.S. PATENT DOCUMENTS

| | | | |
|---|---|---|---|
| 6,975,092 | B2 | 12/2005 | Edington et al. |
| 7,024,690 | B1 | 4/2006 | Young et al. |

(Continued)

FOREIGN PATENT DOCUMENTS

| | | | |
|---|---|---|---|
| CN | 106302379 | A | 1/2017 |
| CN | 106603485 | A | 4/2017 |

(Continued)

*Primary Examiner* — Christopher C Harris

(74) *Attorney, Agent, or Firm* — Bookoff McAndrews, PLLC

(57) ABSTRACT

Discussed are a cross certification method and a certifying device to perform the method. The certifying device can include a certification communication unit; a certification storage unit; and a certification control unit, wherein when a first certification is approved, the certification control unit encrypts a second identification information with a unidirectional encryption algorithm to generate a certification cryptogram, and transmits the certification cryptogram to an electronic device to request a second certification, when receiving a first random number in response to the request for the second certification, the certification control unit inputs the second identification information and an initial vector to a random number generating algorithm to generate a second random number, and the certification control unit compares the first random number and the second random number to verify the first random number, and determines whether to approve the second certification according to a result of the verification.

20 Claims, 3 Drawing Sheets

(56) References Cited

U.S. PATENT DOCUMENTS

| | | | | |
|---|---|---|---|---|
| 10,630,682 | B1 * | 4/2020 | Bhattacharyya | H04L 63/0869 |
| 11,533,180 | B1 | 12/2022 | Huang | |
| 11,870,768 | B1 * | 1/2024 | Vishwakarma | H04W 8/26 |
| 12,470,539 | B2 * | 11/2025 | Kim | H04L 63/0823 |
| 2002/0194477 | A1 | 12/2002 | Arakawa et al. | |
| 2004/0039708 | A1 | 2/2004 | Zhang et al. | |
| 2004/0250089 | A1 | 12/2004 | Ochi et al. | |
| 2005/0210236 | A1 | 9/2005 | Lee et al. | |
| 2005/0210241 | A1 | 9/2005 | Lee et al. | |
| 2005/0210249 | A1 | 9/2005 | Lee et al. | |
| 2005/0210279 | A1 | 9/2005 | Lee et al. | |
| 2005/0216419 | A1 | 9/2005 | Lee et al. | |
| 2005/0216739 | A1 | 9/2005 | Lee et al. | |
| 2005/0216763 | A1 | 9/2005 | Lee et al. | |
| 2005/0267845 | A1 | 12/2005 | Oh et al. | |
| 2005/0268097 | A1 | 12/2005 | Oh et al. | |
| 2005/0268098 | A1 | 12/2005 | Oh et al. | |
| 2005/0268346 | A1 | 12/2005 | Lee et al. | |
| 2006/0117176 | A1 | 6/2006 | Sasaki et al. | |
| 2006/0143453 | A1 | 6/2006 | Imamoto et al. | |
| 2008/0162934 | A1 | 7/2008 | Okawa | |
| 2010/0024029 | A1 | 1/2010 | Sasaki et al. | |
| 2010/0241858 | A1 | 9/2010 | Koo et al. | |
| 2011/0276804 | A1 | 11/2011 | Anzai et al. | |
| 2012/0046015 | A1 | 2/2012 | Little | |
| 2012/0159167 | A1 | 6/2012 | Lee et al. | |
| 2012/0166801 | A1 * | 6/2012 | Park | H04L 9/3228<br>713/169 |
| 2013/0219180 | A1 | 8/2013 | Saino et al. | |
| 2014/0123326 | A1 | 5/2014 | Oh et al. | |
| 2017/0048205 | A1 * | 2/2017 | Fielder | H04L 9/0838 |
| 2017/0099151 | A1 * | 4/2017 | Kim | H04L 9/0643 |
| 2017/0208062 | A1 | 7/2017 | Morikawa et al. | |
| 2017/0262626 | A1 * | 9/2017 | Teegavarapu | G06F 21/445 |
| 2017/0310475 | A1 * | 10/2017 | Hu | H04L 63/0869 |
| 2018/0006829 | A1 * | 1/2018 | Kravitz | H04W 12/06 |
| 2018/0184290 | A1 * | 6/2018 | Luo | H04L 63/0442 |
| 2018/0199205 | A1 | 7/2018 | Zhu et al. | |
| 2018/0285555 | A1 * | 10/2018 | Dong | H04L 63/0428 |
| 2019/0110199 | A1 * | 4/2019 | Hiramatsu | H04L 9/3226 |
| 2019/0207755 | A1 * | 7/2019 | Gu | G06F 21/64 |
| 2020/0067708 | A1 * | 2/2020 | Subba | H04L 9/3226 |
| 2020/0228988 | A1 * | 7/2020 | Yang | H04L 63/1466 |
| 2021/0056053 | A1 * | 2/2021 | Marson | G06F 21/72 |
| 2021/0058658 | A1 | 2/2021 | Kim | |
| 2021/0203650 | A1 | 7/2021 | Becker et al. | |
| 2021/0211858 | A1 * | 7/2021 | Ellenbeck | H04W 72/0466 |
| 2021/0399566 | A1 * | 12/2021 | Visvesha | B60L 53/65 |
| 2022/0083651 | A1 * | 3/2022 | Ghosh | H04L 9/0662 |
| 2022/0094558 | A1 * | 3/2022 | Kaufmann | H04L 9/0819 |
| 2022/0278961 | A1 * | 9/2022 | Andersson | H04L 63/062 |
| 2023/0034996 | A1 * | 2/2023 | Peng | H04L 9/0825 |

FOREIGN PATENT DOCUMENTS

| | | | |
|---|---|---|---|
| CN | 109361669 | A | 2/2019 |
| EP | 1526677 | A1 | 4/2005 |
| EP | 2448305 | A1 | 5/2012 |
| EP | 3182315 | A1 | 6/2017 |
| JP | 2001211171 | A | 8/2001 |
| JP | 2004072214 | A | 3/2004 |
| JP | 2004282295 | A | 10/2004 |
| JP | 2005252702 | A | 9/2005 |
| JP | 2007529836 | A | 10/2007 |
| JP | 2009512035 | A | 3/2009 |
| JP | 2012034303 | A | 2/2012 |
| KR | 1020050117478 | A | 12/2005 |
| KR | 1020060059198 | A | 6/2006 |
| KR | 100954636 | B1 | 4/2010 |
| KR | 1020100105322 | A | 9/2010 |
| KR | 101088074 | B1 | 11/2011 |
| KR | 101100385 | B1 | 12/2011 |
| KR | 1020190094588 | A | 8/2019 |
| KR | 1020190132761 | A | 11/2019 |
| KR | 102134302 | B1 | 7/2020 |
| WO | 2020064227 | A1 | 4/2020 |

* cited by examiner

【FIG. 1】
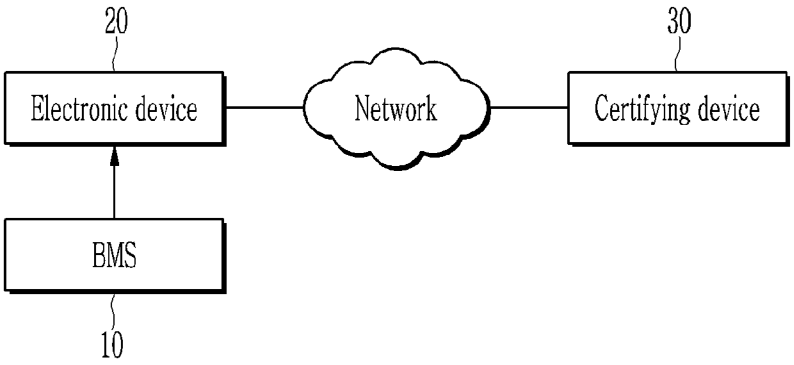
【FIG. 2】
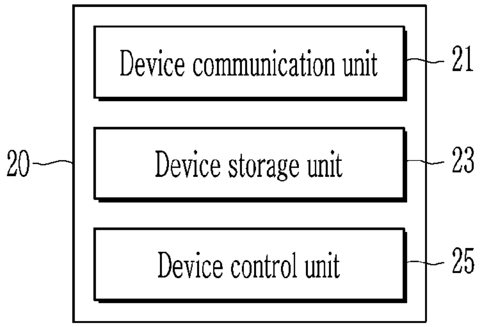
【FIG. 3】
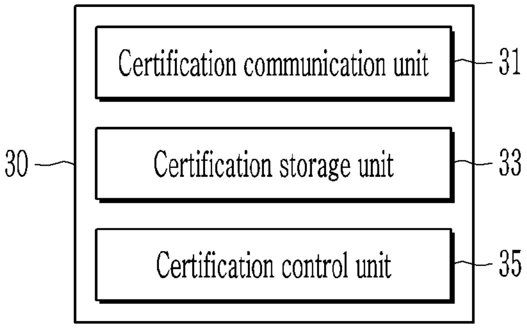

【FIG. 4】
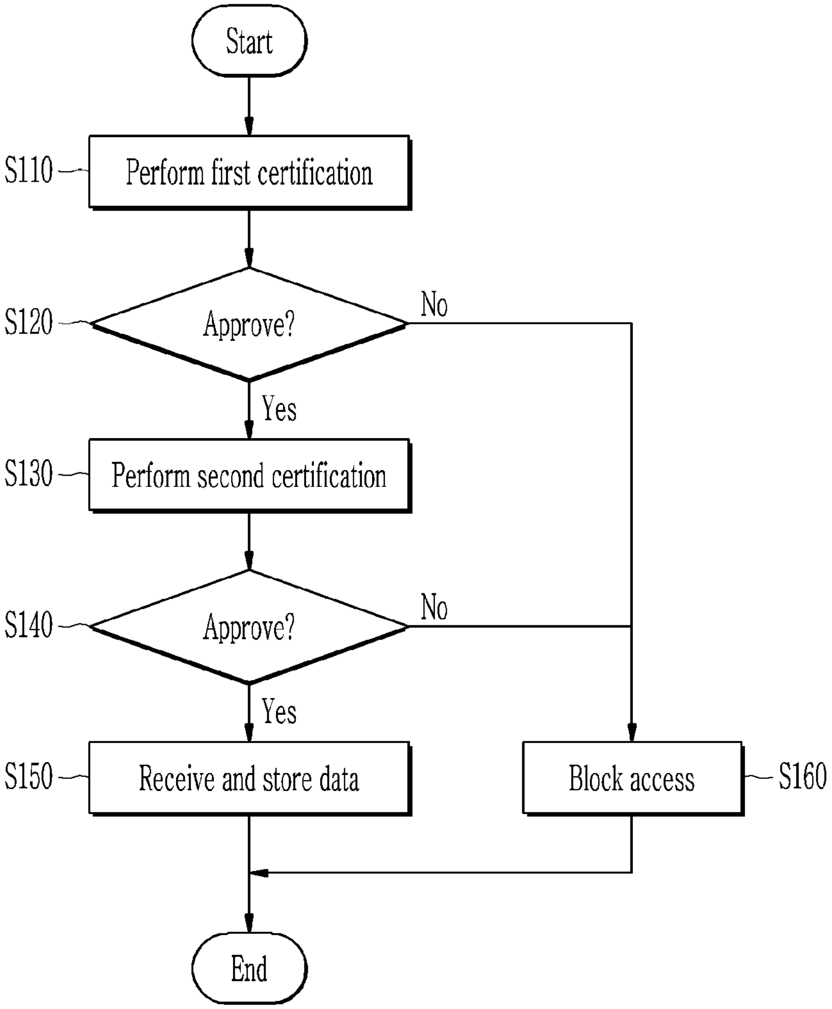

【FIG. 5】
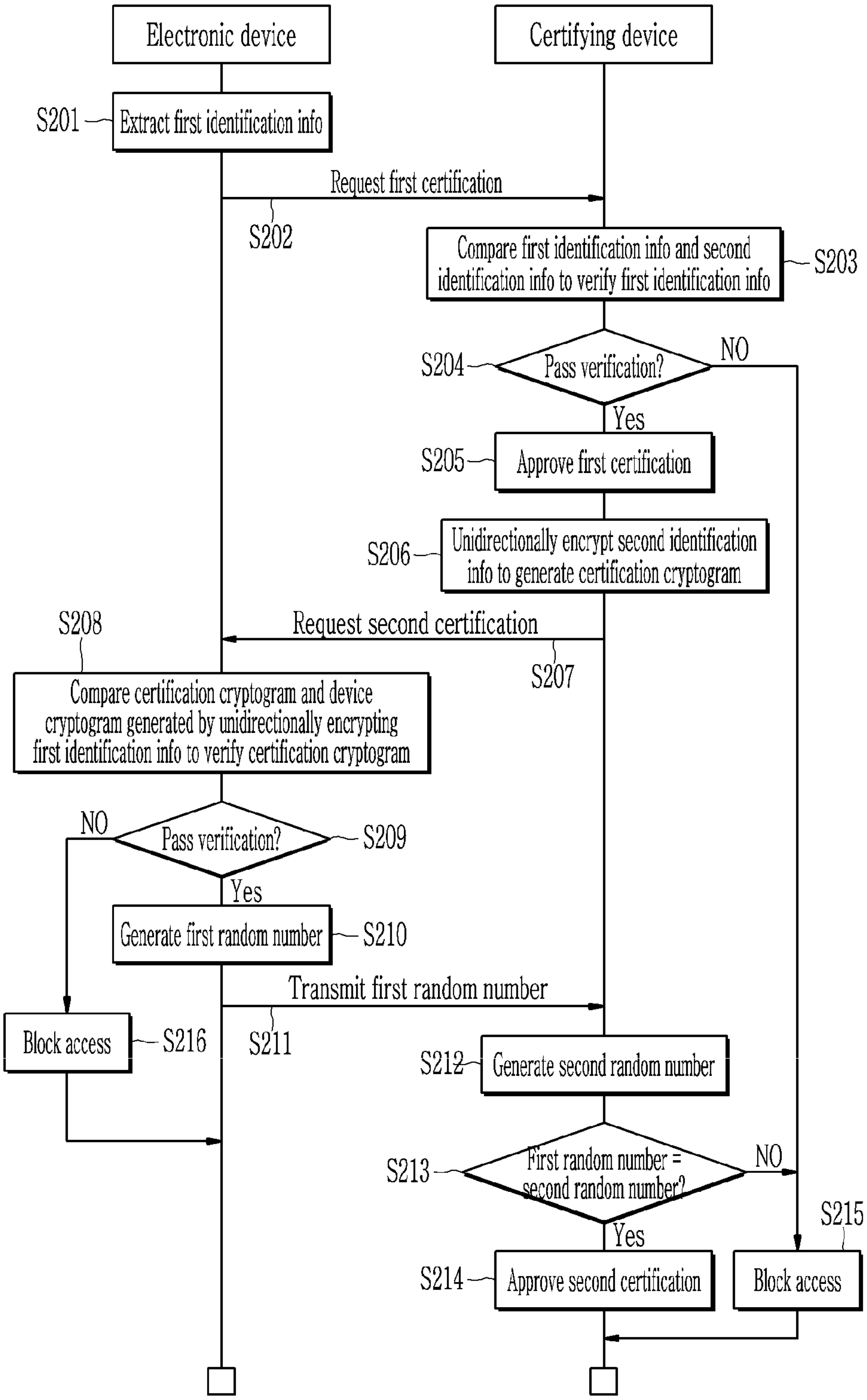

CROSS CERTIFICATION METHOD AND CERTIFYING DEVICE FOR PROVIDING THE METHOD

CROSS-REFERENCE TO RELATED APPLICATION

This application claims priority to and the benefit of Korean Patent Application No. 10-2020-0121338 filed in the Korean Intellectual Property Office on Sep. 21, 2020, the entire contents of which are incorporated herein by reference. The present invention relates to a cross certification method and a certifying device for providing the method.

BACKGROUND OF THE INVENTION

(a) Field of the Invention

(b) Description of the Related Art

Recently, rechargeable batteries are widely used in mobile devices such as laptops or mobile phones, various power transportation vehicles such as electric bicycles, electric vehicles, or hybrid vehicles, power backup devices for supplying power in case of blackouts, and large-capacity power storage devices for storing large-capacity power in advance and supplying power to other devices.

Particularly, regarding devices for supplying a huge amount of power or storing the same such as for electric vehicles (EV) or energy storage systems (ESS), a battery is configured with a battery cell that is a rechargeable battery, a battery module in which a plurality of battery cells are connected in series, and a battery pack in which a plurality of battery modules are connected in series and/or in parallel.

Particularly, the battery pack is managed by a battery management system (BMS). The battery management system (BMS) maintains and manages the battery by monitoring a voltage, a current, and a temperature of the battery pack. The battery management system (BMS) manages the battery system including the battery and its peripheral devices by, for example, predicting a replacement time of the battery and checking battery drawbacks in advance.

There are attempts to store various data collected by the battery management system (BMS) for the purpose of research and development in a remote central server. However, transmission and storage of data through a radio network have problems such as security and certification. That is, solutions to the drawbacks including certifying of a data transmitting device and a data receiving and storing device, and security against external malicious attacks are needed.

SUMMARY OF THE INVENTION

The present invention has been made in an effort to provide a cross certification method for an electronic device and a certifying device to respectively request a certification, approve the requested certification, and accordingly perform a cross certification, and a certifying device for providing the method.

An embodiment of the present invention provides a certifying device including: a certification communication unit configured to receive first identification information from an electronic device requesting a first certification; a certification storage unit configured to store second identification information, a unidirectional encryption algorithm, a random number generating algorithm, and an initial vector that is input when the random number generating algorithm is operated; and a certification control unit configured to compare the first identification information and the second identification information to verify the first identification information, and determine whether to approve the first certification according to a result of the verification, wherein when the first certification is approved, the certification control unit encrypts the second identification information with the unidirectional encryption algorithm to generate a certification cryptogram, and transmits the certification cryptogram to the electronic device to request a second certification, when receiving a first random number from the electronic device in response to the request for the second certification, the certification control unit inputs the second identification information and the initial vector to the random number generating algorithm to generate a second random number, and the certification control unit compares the first random number and the second random number to verify the first random number, and determines whether to approve the second certification according to a result of the verification.

The certification control unit may decrypt data that are encrypted with a first key of a bidirectional encryption algorithm with a second key of the bidirectional encryption algorithm, and may transmit the data encrypted with the second key to the electronic device.

The first key may be a private key, and the second key may be a public key.

The first identification information and the second identification information may respectively include a serial number of the electronic device and a serial number of the certifying device.

The certification control unit may block a network access to the electronic device when the first identification information and the second identification information do not correspond to each other or when the first random number and the second random number do not correspond to each other.

Another embodiment of the present invention provides a cross certification method for a certifying device to perform a cross certification with an electronic device including same certification information, the method including: receiving first identification information from the electronic device requesting a first certification; comparing the first identification information and stored second identification information to verify the first identification information; when the first identification information and the second identification information are found to correspond to each other and pass verification according to a result of the comparison, encrypting the second identification information with a unidirectional encryption algorithm to generate a certification cryptogram; transmitting the certification cryptogram to the electronic device to request a second certification; receiving a first random number from the electronic device in response to the request for the second certification; inputting an initial vector that is input when a random number generating algorithm is operated and the second identification information to the random number generating algorithm to generate a second random number; comparing the first random number and the second random number; and when the first random number and the second random number are found to correspond to each other according to a result of the comparison, determining whether to approve the second certification.

The certifying device may decrypt data that are encrypted with a first key of a bidirectional encryption algorithm with a second key of the bidirectional encryption algorithm, and may transmit the data encrypted with the second key to the electronic device.

The first key may be a private key, and the second key may be a public key.

The first identification information and the second identification information may respectively include a serial number of the electronic device and a serial number of the certifying device.

The cross certification method may further include, after the verifying of first identification information, blocking a network access to the electronic device when the first identification information and the second identification information are found to not correspond to each other according to a result of the comparison.

The cross certification method may further include, after the comparing of the first random number and the second random number, blocking a network access to the electronic device when the first random number and the second random number are found to not correspond to each other.

The present invention may identify the respective devices performing a cross certification, and may provide the certification method and device with high reliability.

BRIEF DESCRIPTION OF THE DRAWINGS

FIG. 1 shows a certification system according to an embodiment.

FIG. 2 shows a configuration of an electronic device of FIG. 1.

FIG. 3 shows a configuration of a certifying device of FIG. 1.

FIG. 4 shows a flowchart of a certification method according to an embodiment.

FIG. 5 shows a flowchart of operations of an electronic device and a certifying device for performing a certification method of FIG. 4.

DETAILED DESCRIPTION OF THE EMBODIMENTS

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like, will be used only to describe various components, and are not interpreted as limiting these components. The terms are only used to differentiate one component from others.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected or coupled to another component without the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

A "network" signifies a connecting structure for respective mutual nodes such as terminals and servers to exchange information, and includes the local area network (LAN), the wide area network (WAN), the Internet (WWW: World Wide Web), wired/wireless data communication networks, telephone networks, and wired/wireless television communication networks. Examples of the data communication networks include the 3G, 4G, 5G, 3rd generation partnership project (3GPP), long term evolution (LTE), world interoperability for microwave access (WIMAX), Wi-Fi, Bluetooth communication, infrared ray communication, ultrasonic wave communication, visible light communication (VLC), and LiFi.

FIG. 1 shows a certification system according to an embodiment.

Referring to FIG. 1, the certification system 1 includes an electronic device 20 and a certifying device 30.

A battery management system (BMS) 10 shown in FIG. 1 monitors a cell voltage, a current, and a temperature of a battery pack (not shown) in real time to adjust a voltage among a plurality of battery cells to be uniform, and prevents excessive charging/discharging to manage the battery to be in an optimized state. The battery management system (BMS) 1O may estimate a state of charge (SOC) and a state of health (SOH) of the battery. In this instance, information generated in the battery system including the measured cell voltages, currents, and temperatures, and the estimated SOC and SOH are defined to be battery data (hereinafter, data). The device for generating data is illustrated to be the battery management system (BMS) 10 in FIG. 1, and without being limited thereto, it may include a device for generating data in many fields.

The electronic device 20 performs a cross certification with the certifying device 30 before transmitting data to the remote certifying device 30. According to an embodiment, the electronic device 20 may configure the battery system together with the battery management system (BMS) 10, and may be included in various types of systems such as the electric vehicle (EV) or the energy storage system (ESS).

The certifying device 30 performs a cross certification with the electronic device 20 before receiving data and storing the data. According to an embodiment, the certifying device 30 may configure a storage system together with a database (not shown), and may be included in various sorts of systems such as a server or a data center.

FIG. 2 shows a configuration of an electronic device of FIG. 1.

Referring to FIG. 2, the electronic device 20 includes a device 10 communication unit 21, a device storage unit 23, and a device control unit 25.

The device communication unit 21 may include a first communication module for communicating with the battery management system (BMS) 10 and a second communication module for communicating with the certifying device 30 through a radio network.

The first communication module may include a communication protocol for communication among devices in the electric vehicle (EV) and may receive data from the battery management system (BMS) 10. For example, the first communication module may include a controller area network (CAN) communication module, a local interconnect network (LIN) communication module, or a FlexRay communication module.

The second communication module may transmit/receive data to/from the certifying device 30 through the radio network. For example, the second communication module may include a radio Internet module such as the wireless LAN (WLAN), the Wi-Fi, the wireless broadband (WiBro), the world interoperability for microwave access (WiMAX), or high speed downlink packet access (HSDPA).

The device storage unit 23 may include a first region for storing first certification information for a cross certification and a second region for temporarily storing the data received from the battery management system (BMS) 10. According to another embodiment, the data generated by the battery management system (BMS) 10 are not temporality stored in the second region of the device storage unit 23, and when the cross certification is successful, the data may be transmitted to the certifying device 30.

The device storage unit 23 may include at least one type of storage medium from among a flash memory type, a hard disk type, a multimedia card micro type, a card type memory (e.g., an SD or XO memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

The first certification information may include first identification information for identifying devices that transmit and receive data, a bidirectional encryption algorithm, a unidirectional encryption algorithm, a random number generating algorithm, and an initial vector that is input when a random number generating algorithm is operated. According to an embodiment, the first certification information may include the same information as the second certification information.

The first identification information may include a serial number of the device for transmitting data after the cross certification is approved. For example, the serial number of the device for transmitting data may include one of a serial number of the electronic device 20, a serial number of the battery from which data will be collected, and a serial number of the battery management system (BMS) 10 for collecting data.

The first identification information may include a serial number of the device for receiving data and storing the data after the cross certification is approved. For example, the serial number of the device for receiving data and storing the data may include one of a serial number of the certifying device 30, and a serial number of the server or the data center for storing the data.

According to an embodiment, the first identification information may include a serial number of the electronic device 20 and a serial number of the certifying device 30. That is, the first identification information may include identification information of a first side and a second side for performing a cross certification.

The bidirectional encryption algorithm is an encryption algorithm for encryption and decryption. The data transmitted and received when performing a cross certification between the electronic device 20 and the certifying device 30 may be encrypted by the bidirectional encryption algorithm and may be transmitted. According to an embodiment, the electronic device 20 and the certifying device 30 may use an asymmetric key type of bidirectional encryption algorithm using different keys for encryption and decryption.

For example, the electronic device 20 may use a private key to perform encryption and decryption, and the certifying device 30 may use a public key to perform encryption and decryption.

In detail, the electronic device 20 transmits a cryptogram generated by encrypting data with a private key to the certifying device 30. The certifying device 30 may decrypt the cryptogram with a public key to restore the data. The certifying device 30 transmits the cryptogram generated by encrypting the data with a public key to the electronic device 20. The electronic device 20 may decrypt the cryptogram with a private key to restore the data.

For another example, the electronic device 20 may perform encryption and decryption by using a public key, and the certifying device 30 may perform encryption and decryption by using a private key.

The unidirectional encryption algorithm may perform encryption and may not perform decryption. In detail, the same data are encrypted into the same cryptogram, but the cryptogram may not be restored into the data. For example, the data may be certified by a verifying process for respectively encrypting the same data with the same unidirectional encryption algorithm and mutually comparing the encrypted values. The unidirectional encryption algorithm generally uses a hash scheme which is SHA-256 or SHA-3.

The random number generating algorithm may generate pseudo-random numbers. Random numbers represent values that are randomly extracted within a defined range, no generation method thereof is determined, and values to be generated next are not predicted at all. The pseudo-random numbers represent numbers that are generated by a predetermined mechanism (a pseudo-random number generator) by using an initially provided input value (an initial value), and they are not real random numbers but are arbitrary numbers that may be considered as random numbers without problems when used.

For example, the pseudo-random numbers may be generated by a computer using the random number generating algorithm. When a generation condition or the input value is the same, the pseudo-random numbers that are resultant values thereof are always the same. When a seed value that is the input value is changed to have a different value, a resultant pseudo-random number is also changed, and the pseudo-random number has the meaning of the random number. The seed value may use a present time that changes every moment. The pseudo-random number will be described as a random number hereinafter.

According to an embodiment, the device control unit 25 may generate a first random number by setting an initial vector that is an initial value used when the random number generating algorithm is operated and first identification information as seed values, and using the present time. The device control unit 25 may calculate the present time based on a reference time that is the time when the electronic device 20 is first operated and a number of counting ticks at predetermined intervals.

According to an embodiment, the device control unit 25 performs a cross certification with the certifying device 30 by using first certification information stored in the first region of the device storage unit 23. When the cross certification is successful, the device control unit 25 may transmit the data stored in the second region of the device storage unit 23 to the certifying device 30. That is, the device control unit 25 may perform a cross certification with the certifying device 30, and may transmit the data to the certifying device 30.

According to another embodiment, the device control unit 25 performs a cross certification with the certifying device 30 by using first certification information stored in the first region of the device storage unit 23. When the cross certification is successful, the device control unit 25 may transmit a cross certification result to the battery management system (BMS) 10. The battery management system (BMS) 10 may transmit the data to the certifying device 30. That is, the device control unit 25 may perform a cross certification with the certifying device 30, and the battery management system (BMS) 10 may transmit the data to the certifying device 30.

FIG. 3 shows a configuration of a certifying device of FIG. 1.

Referring to FIG. 3, the certifying device 30 includes a certification communication unit 31, a certification storage unit 33, and a certification control unit 35.

The certification communication unit 31 may transmit/receive data to/from the electronic device 20 through the radio network. For example, the certification communication unit 31 may include a radio Internet module such as the wireless LAN (WLAN), the Wi-Fi, the wireless broadband (WiBro), the world interoperability for microwave access (WiMAX), or the high speed downlink 20 packet access (HSDPA).

The certification storage unit 33 may store second certification information for the cross certification. The certification storage unit 33 may include at least one type of storage medium from among a flash memory type, a hard disk type, a multimedia card micro type, a card type memory (e.g., an SD or XO memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

According to an embodiment, the server or the data center may include a database (DB) for storing the data transmitted from the electronic device 20 after success of the cross certification through the certifying device 30. For example, the server or the data center may store large-capacity battery data transmitted at predetermined intervals or in real time from a plurality of battery management systems (BMS) mounted on a plurality of electric vehicles (EV) in the database (DB).

The second certification information may include second identification information for identifying devices that transmit and receive data, a bidirectional encryption algorithm, a unidirectional encryption algorithm, a random number generating algorithm, and an initial vector that is input when a random number generating algorithm is operated. According to an embodiment, the second certification information may include the same information as the first certification information stored in the electronic device 20.

According to an embodiment, the second identification information may include a serial number of the electronic device 20 and a serial number of the certifying device 30. That is, the second identification information may include identification information on the first side and the second side for performing a cross certification. For example, the second identification information may include the same identification information as the first identification information.

The certification control unit 35 performs a cross certification with the electronic device 20 by using the second certification information stored in the certification storage unit 33. When the cross certification is successful, the certification control unit 35 may transmit a cross certification result to a central control unit (not shown) of the server or the data center. The central control unit (not shown) may maintain a network access to the electronic device 20, and may store the data transmitted from the electronic device 20 in the database (DB).

FIG. 4 shows a flowchart of a certification method according to an embodiment.

The electronic device 20 and the certifying device 30 perform a cross certification. Here, differing from a single certification method for, when one side requests a certification and another side verifies it and determines an approval of certification or a rejection of certification, the cross certification represents a certification method for the electronic device 20 and the certifying device 30 to determine an approval of certification or a rejection of certification on the request of certification from the other side. According to an embodiment, the electronic device 20 and the certifying device 30 may store the same certification information and encryption algorithm, and may perform the cross certification based upon the same.

Referring to FIG. 4, when the electronic device 20 encrypts first identification information with the first key of the bidirectional encryption algorithm and transmits the encrypted first identification information to the certifying device 30 to request a first certification, the certifying device 30 determines whether to approve the first certification (S110).

The electronic device 20 may encrypt the first identification information with a private key and may transmit the same to the certifying device 30. The first identification information may include a serial number of the electronic device 20 and a serial number of the certifying device 30. The electronic device 20 may encrypt the first identification information with a public key and may transmit the same to the certifying device 30.

For example, when the electronic device 20 uses the private key as a first key, the certifying device 30 may use the public key as a second key. When the electronic device 20 uses the public key as a first key, the certifying device 30 may use the private key as a second key. The electronic device 20 and the certifying device 30 may then respectively decrypt the received encrypted information with their own keys.

The certifying device 30 compares the first identification information and the stored second identification information and determines whether to approve or reject the first certification (S120).

The certifying device 30 decrypts the encrypted first identification information with the second key of the bidirectional encryption algorithm. According to an embodiment, the certifying device 30 compares the serial number of the electronic device 20 and the serial number of the certifying device 30 included in the first identification information and the stored second identification information, that is, the serial number of the stored electronic device 20 and the serial number of the certifying device 30, to determine whether they correspond to each other.

When they are found to correspond to each other according to a comparison result, the first certification is approved (S120, Yes), the certifying device 30 encrypts the second identification information with the unidirectional encryption algorithm to generate a certification cryptogram, and transmits the certification cryptogram to the electronic device 20 to request a second certification (S130).

According to an embodiment, the certifying device 30 may encrypt the certification cryptogram with the second key of the bidirectional encryption algorithm and may transmit the same to the electronic device 20. That is, the certifying device 30 may first-encrypt the second identification information with the unidirectional encryption algorithm, may second-encrypt the certification cryptogram generated by the first encryption with the second key of the bidirectional encryption algorithm, and may transmit a result to the electronic device 20.

The certifying device 30 may encrypt the data with the second key of the bidirectional encryption algorithm and may transmit the same to the electronic device 20 in a final stage of transmitting the data. The certifying device 30 may decrypt the data that are encrypted with the first key of the bidirectional encryption algorithm and are received with the second key of the bidirectional encryption algorithm.

The electronic device 20 decrypts the certification cryptogram encrypted with the second key and received, with the first key. The electronic device 20 encrypts the first identification information with the unidirectional encryption algorithm to generate a device cryptogram. When the electronic device 20 and the certifying device 30 use the same unidirectional encryption algorithm, and the first identification information and the second identification information are the same, the certification cryptogram and the device cryptogram have the same value because of a characteristic of the unidirectional encryption algorithm.

The electronic device 20 compares the certification cryptogram and the device cryptogram to verify the certification cryptogram. When they are found to correspond to each other according to a comparison result, the electronic device 20 inputs the initial vector and first identification information to the random number generating algorithm to generate a first random number, and encrypts the generated first random number with the first key. The first identification information input as the seed value is the serial number of the electronic device 20 or the serial number of the certifying device 30, and it may be a serial number that is predefined by the certifying device 30.

The electronic device 20 transmits the first random number encrypted with the first key to the certifying device 30 in response to the request of second certification.

The certifying device 30 inputs the stored initial vector and the second identification information to the random number generating algorithm to generate a second random number. The second identification information input as the seed value is the serial number of the electronic device 20 or the serial number of the certifying device 30, and it may be a serial number that is predefined by the electronic device 20.

The certifying device 30 decrypts the first random number with the second key and compares it with the second random number to determine whether they correspond to each other (S140).

That is, the certifying device 30 may request a second certification from the electronic device 20, and may determine whether to approve the second certification based on the response to the request.

When they are found to correspond to each other according to a result of determination (S140, Yes), the certifying device 30 approves the second certification (S150). The network access of the electronic device 20 and the certifying device 30 is maintained, and when the electronic device 20 transmits data, the certifying device 30 may receive the data and may store the same.

When they are found to not correspond to each other according to the result of determination (S140, No), the certifying device 30 rejects the second certification and blocks the network access of the electronic device 20 and the certifying device 30 (S160).

FIG. 5 shows a flowchart of operations of an electronic device and a certifying device for performing a certification method of FIG. 4.

FIG. 5 shows a detailed drawing of FIG. 4. A cross certification method will now be described with reference to FIG. 1 to FIG. 5.

Referring to FIG. 5, the electronic device 20 encrypts the first identification information with the first key of the bidirectional encryption algorithm and transmits the same to the certifying device 30 to request a first certification (S201 and S202).

The electronic device 20 may encrypt the first identification information with the private key and may transmit the same to the certifying device 30. The first identification information may include the serial number of the electronic device 20 and the serial number of the certifying device 30.

The certifying device 30 compares the first identification information and the stored second identification information to verify the first identification information (S203).

The certifying device 30 decrypts the encrypted first identification information with the second key of the bidirectional encryption algorithm. For example, the certifying device 30 may decrypt the first identification information with the public key.

According to an embodiment, the certifying device 30 may compare the serial number of the electronic device 20 and the serial number of the certifying device 30 included in the first identification information and the stored second identification information, that is, the serial number of the stored electronic device 20 and the serial number of the certifying device 30, and may determine whether they correspond to each other.

When they are found to correspond to each other and pass the verification according to a result of comparison (S204, Yes), the certifying device 30 approves the first certification (S205).

The certifying device 30 encrypts the second identification information with the unidirectional encryption algorithm to generate a certification cryptogram, encrypts the certification cryptogram with the second key, and transmits the encrypted certification cryptogram to the electronic device 20 to request a second certification (S206 and S207).

According to an embodiment, the certifying device 30 may encrypt the certification cryptogram with the second key of the bidirectional encryption algorithm and may transmit the encrypted certification cryptogram to the electronic device 20. That is, the certifying device 30 may first-encrypt the second identification information with the unidirectional encryption algorithm, may second-encrypt the certification cryptogram generated by the first encryption with the second key of the bidirectional encryption algorithm, and may transmit a result to the electronic device 20.

The certifying device 30 may encrypt the data with the second key of the bidirectional encryption algorithm and may transmit the same to the electronic device 20 in a final stage of transmitting the data. The certifying device 30 may decrypt the data that are encrypted with the first key of the bidirectional encryption algorithm and are received with the second key of the bidirectional encryption algorithm.

The electronic device 20 encrypts the first identification information with the unidirectional encryption algorithm to generate a device cryptogram, and compares the received certification cryptogram and the device cryptogram to verify the certification cryptogram (S208).

When the electronic device 20 and the certifying device 30 use the same unidirectional encryption algorithm, and the first identification information and the second identification information are the same, the certification cryptogram and the device cryptogram have the same value because of a characteristic of the unidirectional encryption algorithm.

The electronic device 20 decrypts the certification cryptogram encrypted with the second key and received, with the first key. The electronic device 20 compares the certification cryptogram and the device cryptogram to verify the certification cryptogram.

When they are found to correspond to each and pass the verification according to a result of comparison (S209, Yes), the electronic device 20 inputs the first identification information and the initial vector to the random number generating algorithm to generate a first random number (S210). The first identification information input as the seed value is the serial number of the electronic device 20 or the serial number of the certifying device 30, and it may be a serial number that is predefined by the certifying device 30.

The electronic device 20 encrypts the first random number with the first key and transmits the encrypted first random number to the certifying device 30 in response to the request of second certification (S211).

When they are found to not correspond to each other and they fail to pass the verification according to a result of comparison (S209, No), the electronic device 20 blocks the network access to the certifying device 30 (S216). For example, the electronic device 20 may determine the certifying device 30 to be unreliable, and it may not transmit various types of data such as battery data to the certifying device 30.

The certifying device 30 inputs the second identification information and the initial vector to the random number generating algorithm to generate a second random number (S212). The second identification information input as the seed value is the serial number of the electronic device 20 or the serial number of the certifying device 30, and it may be a serial number that is predefined by the electronic device 20.

The certifying device 30 decrypts the first random number with the second key and compares the decrypted first random number with the second random number to determine whether they correspond to each other (S213).

When they are found to correspond to each other according to a result of determination (S213, Yes), the certifying device 30 approves the second certification (S214).

According to an embodiment, the certifying device 30 may request a second certification from the electronic device 20, and may determine whether to approve the second certification based on the response to the request. When the second certification is approved, the network access of the electronic device 20 and the certifying device 30 is maintained, and when the electronic device 20 transmits data, the certifying device 30 may receive the data and may store the same.

When the first identification information and second identification information do not correspond to each other and fail to pass the verification according to a result of comparison (S204, No) or when they do not correspond to each other according to a result of determination (S213, No), the certifying device 30 determines whether to reject the first certification or reject the second certification, and to block the network access of the electronic device 20 and the certifying device 30 (S215).

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A certifying device comprising:
a certification controller configured to:
- compare first identification information of an electronic device and second identification information of the certifying device to verify the first identification information;
- determine whether to approve a first certification requested by the electronic device according to a result of the verification of the first identification information;
- responsive to approving the first certification, encrypt the second identification information with a first encryption algorithm to generate an encrypted certification message;
- transmit the encrypted certification message to the electronic device to request a second certification;
- responsive to receiving a first random element from the electronic device in response to the request for the second certification, input the second identification information and an initial vector to a random element generating algorithm to generate a second random element;
- compare the first random element with the second random element to verify the first random element; and
- determine whether to approve the second certification according to a result of the verification of the first random element.

2. The certifying device of claim 1, wherein the certification controller is configured to decrypt data that are encrypted with a first key of a second encryption algorithm with a second key of the second encryption algorithm, and transmit the data encrypted with the second key to the electronic device.

3. The certifying device of claim 2, wherein the first key is a private key, and the second key is a public key.

4. The certifying device of claim 2, wherein the first key is a public key, and the second key is a private key.

5. The certifying device of claim 1, wherein the first identification information and the second identification information respectively include a serial number of the electronic device and a serial number of the certifying device.

6. The certifying device of claim 5, wherein the certification controller is configured to compare the serial numbers of the electronic device and the certifying device in the first identification information with the serial numbers of the electronic device and the certifying device in the second identification information.

7. The certifying device of claim 1, wherein the encrypted certification message comprises a certification cryptogram.

8. The certifying device of claim 1, wherein the certification controller is configured to block a network access to the electronic device responsive to determining that:

the first identification information and the second identification information do not correspond to each other; or the first random element and the second random element do not correspond to each other.

9. A non-transitory computer readable medium comprising instructions configured to cause a processor to perform a process, the process comprising:

responsive to determining that first identification information of an electronic device and second identification information of a certifying device correspond to each other, encrypting the second identification information with a first encryption algorithm to generate an encrypted certification message;

transmitting the encrypted certification message to the electronic device to request a second certification;

receiving a first random element from the electronic device in response to the request for the second certification;

inputting an initial vector and the second identification information to a random element generating algorithm to generate a second random element;

comparing the first random element with the second random element; and determining whether to approve the second certification according to a result of the comparison.

10. The non-transitory computer readable medium of claim 9, wherein the process further comprises decrypting data that are encrypted with a first key of a second encryption algorithm with a second key of the second encryption algorithm, and transmitting the data encrypted with the second key to the electronic device.

11. The non-transitory computer readable medium of claim 10, wherein the first key is a private key, and the second key is a public key.

12. The non-transitory computer readable medium of claim 10, wherein the first key is a public key, and the second key is a private key.

13. The non-transitory computer readable medium of claim 10, wherein the first identification information and the second identification information respectively include a serial number of the electronic device and a serial number of the certifying device.

14. The non-transitory computer readable medium of claim 13, wherein the process further comprises comparing the serial numbers of the electronic device and the certifying device in the first identification information with the serial numbers of the electronic device and the certifying device in the second identification information.

15. The non-transitory computer readable medium of claim 9, wherein the process further comprises, after the verification of the first identification information, blocking a network access to the electronic device responsive to determining that the first identification information and the second identification information do not correspond to each other.

16. The non-transitory computer readable medium of claim 9, wherein the process further comprises, after the comparison of the first random element and the second random element, blocking a network access to the electronic device responsive to determining that the first random element and the second random element do not correspond to each other.

17. A cross certification method for an electronic device to perform a cross certification with a certifying device including same certification information, the method comprising:

transmitting first identification information to the certifying device to request a first certification;

receiving an encrypted certification message from the certifying device for a second certification;

encrypting the first identification information of the electronic device using an encryption algorithm to generate an encrypted device message;

comparing the received encrypted certification message with the encrypted device message to verify the encrypted certification message; and determine whether the received encrypted certification message and the encrypted device message correspond to each other.

18. The cross certification method of claim 17, further comprising:

responsive to determining that the received encrypted certification message and the encrypted device message correspond to each other, inputting an initial vector and the first identification information to a random element generating algorithm to generate a first random element; and transmitting the first random element to the certifying device.

19. The cross certification method of claim 17, further comprising blocking a network access to the certifying device responsive to determining that the received encrypted certification message and the encrypted device message do not correspond to each other.

20. The cross certification method of claim 17, wherein the electronic device is at least a portion of an electric vehicle or an energy storage system.

* * * * *